United States Patent Office 3,435,100
Patented Mar. 25, 1969

3,435,100
O,O-DILOWER ALKYL-O-(3-LOWER ALKYL-4-SULFONOYL)PHENYL PHOSPHOROTHIOATES
Milon W. Bullock, Hopewell, and George H. Rohrbacher, Jr., Princeton Junction, N.J., assignors to American Cyanamid Company, Stamford, Conn., a corporation of Maine
No Drawing. Continuation-in-part of application Ser. No. 257,746, Feb. 11, 1963. This application July 6, 1964, Ser. No. 380,607
Int. Cl. C07f 9/18, 9/2; A61k 27/00
U.S. Cl. 260—944                                   2 Claims

ABSTRACT OF THE DISCLOSURE

The preparation of phosphorothioic acid or phosphoric acid, O,O-dilower alkyl-O-(3-lower alkyl-4-sulfamoyl) phenyl esters from benzene sulfonates such as, potassium 2-methyl-4-hydroxybenzene sulfonate through a series of reactions, is described. The novel compounds of the invention are systemic insecticides.

This application is a continuation-in-part of our copending application Ser. No. 257,746, filed Feb. 11, 1963.

This invention relates to a new class of organic compounds. More particularly, it relates to sulfamoylphenyl esters of organic phosphates, methods for the preparation thereof and to the use of such compounds for controlling parasites attacking warm-blooded animals.

It is well-known that domestic animals are subject to attack by a number of different parasites, including fleas, flies, lice, ticks, screwworms and ruminant arthropod pests such as grubs in cattle as well as the helminthic parasites such as lung worms, stomach worms and gastrointestinal worms. Many compounds, including compounds related to those mentioned above, have been found to be somewhat effective for controlling such parasites attacking warm-blooded animals. To date no entirely satisfactory parasiticide has been available. Many compounds found to be highly effective are difficult to synthesize, expensive, and having a relatively low margin of safety between the dosage required for full effectiveness and the dose level at which the compound is toxic.

We have now found that compounds of the following formula are highly effective parasiticides:

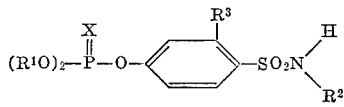

where $R^1$ is a lower alkyl radical, $R^2$ is selected from the group consisting of hydrogen and lower alkyl radicals, $R^3$ is selected from the group consisting of lower alkyl and halogen and X is selected from the group consisting of sulfur and oxygen.

Although it is known that compounds similar to those of this invention, but where $R^3$ is hydrogen, have antiparasitic utility when administered to domestic animals by the oral, cutaneous, or various parenteral routes, the margin of safety between effective and toxic doses in these known compounds is not wide enough for complete safety against all parasites in all types of domestic animals. This is particularly true under conditions where it is necessary to treat large groups of animals, when it is not practical to weigh each animal and treat according to individual weights. Since efficacy is usually dependent upon dosage on a relative and not on absolute animal weight basis, i.e., upon mg. of drug/kg. of animal body weight, and since individual animal weights may vary by at least twofold or more, for a group of animals of the same age group, there are great advantages in compounds with a wide margin of safety.

It is also well known that there is considerable variability in susceptibility of different individual animals of identical weight to the toxic side effects of various antiparastic agents, which further emphasizes the advantage of agents with wider margins of safety. Although compounds with narrower safety margins are useful for many applications where good parasite control can be obtained with a single treatment, or a series of single treatments at, e.g., monthly intervals, there are many other situations where the life cycle of the parasite is such that numerous repeated treatments or even continuous treatment is essential to obtain good parasite control. Such situations occur when the parasite has free-living stages widely disseminated in the external environment, stages parasitic on other hosts, etc. These situations are respectively exemplified by mosquitoes or by ectoparasites such as fleas of pets such as dogs and cats and by cattle ticks; against such parasites, best controlled by continuous or frequent treatment, it is particularly useful to have agents with a considerable margin of safety, such as is present in the compounds of this invention.

The present invention is based upon the finding that the new class of compounds represented by the general formula set forth above are highly effective, systemic insecticides which have the surprising property of being substantially nontoxic to mammals even when administered at high dose levels. While the exact dose to be administered to the animal is dependent upon the parasite to be controlled and the particular organic phosphate employed as well as upon whether the administration is to be in a single dose or in multiple doses over a period of days, in general, it has been found that the systemic insecticides of this invention may be administered orally or parenterally to warm-blooded animals in amounts ranging from about 0.05 to about 500 milligrams per kilogram of body weight and preferably from about 1.0 to about 200 milligrams per kilogram of body weight. An important advantage of the invention lies in the fact that the drug is metabolized in the body of the animal so that the flesh thereof is safe to eat by humans wtihin a reasonably short period after the animal has been treated with the insecticide.

As indicated above, the systemic insecticides of the present invention may be administered orally or parenterally. When given orally, they may be in any convenient and customary oral form of medication, such as a capsule, tablet or as a drench. This insecticide may be incorporated in the animals' feed or drinking water. If desired, the insecticide may be introduced into the body of the animal by hypodermic, intraperitoneal or intramuscular injection. In special circumstances where the compounds are absorbed through the skin, dusts, dips, sprays or "pour-on" solutions or emulsions may be used. The manner of administration of the insecticide is not particularly important so long as the prescribed amounts of the insecticide are introduced on or into the body of the animal where it may be distributed throughout the body by the action of the circulatory system.

In general, the compounds of the subject invention may be prepared by reacting an appropriate benzene sulfonate, for example, potassium 2-methyl-4-hydroxybenzene sulfonate with acetic anhydride to form the corresponding acetoxy sulfonate which is then reacted with phosphorous pentachloride to produce a corresponding sulfonyl chloride, e.g., 4-acetoxy-2-methylbenzene sulfonyl chloride. This compound is then treated with an amine to form the sulfonamide which is reacted under suitable conditions in the presence of a suitable aqueous or inert polar solvent such as, for example, water, acetone or methyl ethyl ketone, etc., with an appropriate phosphorochlorodithioate or phosphoryl chloride to produce the corresponding sulfamoylphenyl ester of phosphorothioic or phosphoric acid.

In the present specification and claims, the term "lower alkyl" is intended to cover those having 1 to 4 carbon atoms.

The invention will be described in greater detail in conjunction with the following specific examples which describe the preparation of representative compounds and the activity of these compounds in various animals.

EXAMPLE 1

Preparation of 2-methyl-4-hydroxybenzene sulfonamide

A stirring solution of 540.7 g. (5 moles) of M-cresol in 2500 ml. carbon tetrachloride is treated at —15° C. with 582.6 g. (5 moles) of chlorosulfonic acid. The solidified product is filtered off and rearranged by heating several hours at 110° C. in an oil bath. A four mole aliquot of the oil is converted to the barium salt by pouring into a hot aqueous solution of 631 g. (2 moles) of barium hydroxide octahydrate. The mixture is allowed to cool and the precipitated salt filtered off. The salt is extracted with 1500 ml. of hot water and filtered. The undissolved material (barium 2-hydroxy-4-methylbenzene sulfonate) weighs 419 g. (0.95 mole of salt). The mother liquors from the preparation of this salt are combined and 292 g. (2.11 moles) of potassium carbonate is added. The mixture is heated to boiling and the precipitated barium carbonate filtered off. The filtrate is concentrated to a low volume and allowed to cool. The crystalline product is filtered off and washed with cold water. The yield of the potassium 4-hydroxy-2-methylbenzene sulfonate is 143 g.

A mixture of 143 g. (0.66 mole) potassium 4-hydroxy-2-methylbenzene sulfonate, 200 ml. acetic anhydride, 300 ml. acetic acid and 0.5 ml. pyridine is refluxed two hours and left standing overnight. The solvents are removed under reduced pressure of a water aspirator with a rotary evaporator. The residue is dried and combined with 164 g. (0.79 mole) phosphorous pentachloride. The reaction mixture is heated on the steambath two hours and left standing overnight. The reaction mixture is poured into a mixture of ice and water. The sulfonyl chloride is extracted with toluene. The toluene solution is dried over magnesium sulfate and the solvent evaporated. The oily residue is distilled and the fractions distilling 137°–138.5° C. at 0.4 mm. is collected as product. The product had $n_D^{25}$ 1.5477. The yield was 110.5 g. (0.445 mole), 68% based on the starting phenol.

Gaseous ammonia is bubbled into a stirring solution of 12.4 g. (0.05 mole) of 4-acetoxy-2-methylbenzene sulfonyl chloride in approximately 200 ml. of ether until an excess of ammonia is present. The reaction mixture is cooled in an ice bath during the addition of the ammonia. A precipitate is filtered off and slurried with water leaving 6.9 g. of material, melting point 127°–131° C. This product shows a carbonyl absorption in the infrared. An additional 7.8 g. of crude product is obtained by evaporation of the ether solution. Attempts to purify the acetate are unrewarding so the combined products are hydrolyzed on the steambath with excess sodium hydroxide solution. The product is recovered by acidification and extraction with ether. The product weighs 4.9 g. and melts at 174°–185° C. Recrystallization from acetonitrile yielded 2.0 g. (0.011 mole), 21.4% of pure 4-hydroxy-2-methylbenzene sulfonamide, melting point 206°–206.5° C.

EXAMPLE 2

Preparation of phosphorothioic acid, O,O-diethyl-O-(3-methyl-4-sulfamoyl)phenyl ester A mixture of 9.36 g. (0.05 mole) of 4-hydroxy-3-methylbenzene sulfonamide, 200 ml. water, 100 ml. acetone, 20.73 g. (0.15 mole) anhydrous potassium carbonate, and 18.9 g. (0.10 mole) of diethylphosphorochloridothionate is stirred vigorously overnight. The product is recovered by two extractions with ether. The combined ether extracts are washed with water and dried over sodium sulfate. Evaporation of the ether leaves 14.0 g. (0.414 mole), 82.5% of product, melting point 77.5°–79.5° C. Recrystallization of a 2 g. aliquot from benzene gives 1.6 g. melting 80°–81.5° C. A second recrystallization does not increase the melting point.

EXAMPLE 3

Preparation of phosphorothioic acid, O,O-dimethyl-O-(3-methyl-4-sulfamoyl)phenyl ester A mixture of 9.36 g. (0.05 mole) of 4-hydroxy-3-methylbenzene sulfonamide, 200 ml. water, 100 ml. acetone, 20.73 g. (0.15 mole) anhydrous potassium carbonate and 16.1 g. (0.10 mole) dimethylphosphorochloridothionate is stirred vigorously at room temperature overnight. The product is recovered by extraction with ether. The ether extract is washed with water and dried over sodium sulfate. The solvent is evaporated leaving 15.2 g. (0.049 mole) 98% of crude product, melting point 75°–80° C. Recrystallization from benzene gives 11.5 g. of crystalline product, melting point 83°–84° C. A small amount is recrystallized a second time to obtain an analytical sample, melting point 84°–85° C.

EXAMPLE 4

Preparation of phosphoric acid, O,O-diethyl-O-(3-methyl-4-sulfamoyl)phenyl ester A mixture of 9.8 g. (0.0525 mole) of 4-hydroxy-2-methylbenzene sulfonamide, 18.1 g. (0.105 mole) of diethylphosphoral chloride, 21.8 g. (0.157 mole) of anhydrous potassium carbonate, 200 ml. of water and 100 ml. of acetone is stirred vigorously at room temperature overnight. Water is added and the product is extracted with ether. The ether solution is dried over sodium sulfate and evaporated leaving 10.8 g. (0.0334 mole), 63.6% of product, melting point 76°–78.5° C. An analytical sample, melting point 79°–80° C. is obtained by recrystallization from toluene followed by a recrystallization from an ethyl acetate-hexane mixture.

EXAMPLE 5

Preparation of N-methyl-4-hydroxy-2-methylbenzene sulfonamide

A stream of gaseous methylamine is bubbled into a solution of 12.4 g. (0.05 mole) 4-acetoxy-2-methylbenzene sulfonyl chloride in approximately 200 ml. of dry diethyl ether until an excess of the amine is present. The reaction mixture is cooled in ice while the amine is added. The precipitated material is filtered off, washed with ether, taken up in water and acidified. The product is extracted with ether. Evaporation of the dried sodium sulfate ether extract left an oil. The oil is distilled to yield 3.3 g. (0.0163 mole), 32.6% of material, boiling point 210° at 0.05 mm. and crystallizing when stirred with cyclohexane to a solid, melting point 77°–85° C. After three recrystallizations from ethylene chloride an analytical sample is obtained, melting point 87°–88° C.

EXAMPLE 6

Preparation of phosphorothioic acid, O,O-diethyl-O-(3-methyl-4-N-methylsulfamoyl)phenyl ester A 500 ml. round-bottom flask is charged with 15.9 g. (0.115 mole) of anhydrous potassium carbonate, 200 ml. water, 100 ml. acetone, 7.72 g. (0.0385 mole) 4-hydroxy-3-methyl-N-methylbenzene sulfonamide, and 14.6 g. (0.077 mole) of diethylphosphorochloridothionate. The mixture is stirred vigorously overnight. The product is recovered by extraction with two portions of ether. The combined ether extracts are washed with water, dried over sodium sulfate and evaporated to yield 14.3 g. (0.405 mole), 105% of crude oily product. The oil is distilled in two lots with a molecular still at a pressure of 0.002 mm. at a bath temperature of 125° C. The tractions having $n_D^{25}$ between 1.5362 and 1.5375 are accepted as product. The yield is 7.7 g. (0.0218 mole) 56.5%. A sample, melting point 85.5°–86.5° C.

EXAMPLE 7

Preparation of phosphorothioic acid, O,O-dimethyl-O-(3-methyl-4-N-methylsulfamoyl)phenyl ester A 500 ml. flask is charged with 15.9 g. (0.115 mole) of anhydrous potassium carbonate, 200 ml. water, 100 ml. acetone, 7.72 g. (0.0385 mole) N-methyl-4-hydroxy-3-methylbenzene sulfonamide and 12.3 g. (0.077 mole) of dimethylphosphorochloridothionate. The mixture is stirred vigorously at room temperature overnight. Water is added and the product recovered by two extractions with ether. The combined ether extracts are dried over sodium sulfate and evaporated leaving 11.5 g. (0.0354 mole), 92% of product, melting point 78°–84° C. Recrystallization from carbon tetrachloride yields 10.9 g. of product, melting point 83.5°–85.5° C. An aliquot is recrystallized a second time to obtain an analytical sample, melting point 85.5°–86.5° C.

EXAMPLE 8

White mice weighing approximately 20 gm. are given orally by stomach tube 0.5 ml. of 0.2% agar solution containing the compound either in solution or in a very fine suspension in the proper amount for the mg./kg. dosage. The mice are then held for a minimum of 3 days to observe acute toxicity.

When systemic insecticidal activity is tested, the above procedure for dosing of mice is used. Then one hour after dosing, the mice are put in tubular restraining cages and placed on top of jars containing between 10 and 20 female *Aedes aegypti* mosquitoes which have never before had a blood meal. The mosquitoes are permitted to feed for approximately one-half hour. At the end of this period the mice are removed, the jars chilled to immobilize the mosquitoes which are then checked to determine how many fed. Those which fed are removed and are held for 3 days observation to determine mortality due to the systemic insecticide. The $ED_{50}$ (effective dose killing 50% of the mosquitoes) is estimated from the number killed at the various dosages over this period. The results obtained in these tests appear in Tables I and II below.

Following the procedure set forth above for testing in mice, rabbits were treated with various dosages of the compounds of the subject invention to determine the minimal lethal dose therefor. The results obtained appear in Table I below.

The decreased mammalian toxicity present in the members of this invention is shown in the accompanying Table I. It will be noted that certain compounds of the present invention are more than 50 times as safe to mammals as the similar compounds lacking a methyl substituent on the benzene ring.

Additionally, it can be seen by examination of Table II that, despite the decreased mammalian toxicity of the subject compound, they have systemic animal insecticide action and show considerably increased margins of safety (therapeutic indices) as systemic insecticides over the similar compounds without alkyl substituents on the benzene ring.

TABLE I

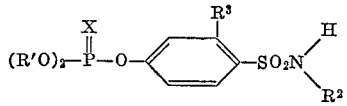

| Compound | R' | X | R² | R³ | Mouse, Single Oral LD₅₀, Mg./Kg. | Rabbit, Minimal Lethal Oral Dose, Mg./Kg. | Approximate Increased Safety [2] | |
|---|---|---|---|---|---|---|---|---|
| A | CH₃ | S | H | 3-CH₃ | >2,000 | [1](40) | >500 (100) | >5 >50 |
| B | C₂H₅ | O | H | 3-CH₃ | 60 | (22) | >20 (2.5) | 3 >8 |
| C | C₂H₅ | S | H | 3-CH₃ | 90 | (20) | >25 (25) | >1 >4 |
| D | CH₃ | S | CH₃ | 3-CH₃ | >2,000 | (15) | >500 (60) | >8 >120 |
| E | C₂H₅ | S | CH₃ | 3-CH₃ | 80 | ---- | 10 ---- | |
| F | CH₃ | S | H | 3-Cl | 500 | (40) | >100 (100) | >1 >12 |

[1] Values in (□) are for compounds in which R³ is H.
[2] Of 3-CH₃ compounds in mouse and rabbit. Values are by magnitude, regardless of species.

TABLE II

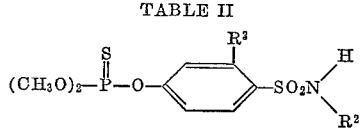

| Compound | R₂ | R₃ | Mouse Oral LD₅₀ Mgm./Kg. | Aedes ED₅₀ Mgm./Kg. | Therapeutic Index [1] |
|---|---|---|---|---|---|
| A | H | CH₃ | >2,000 | 0.25 | >8,000 |
| A' | H | H | 40 | 0.03 | 1,300 |
| D | CH₃ | CH₃ | >1,000 | 2.5 | >400 |
| D' | CH₃ | H | 15 | 0.1 | 150 |

[1] Mouse Oral LD₅₀ / Mouse Oral Dose Killing 50% of *Aebes aegypti* fed on the mouse.

EXAMPLE 9

The following test demonstrates that very useful systemic activity against fleas on dogs occurs following single or repeated oral administration to dogs in feed or by capsule of phosphorothioic acid, O,O-dimethyl-O-(3-methyl-4-sulfamoyl)phenyl ester in doses well tolerated by dogs. (See Table III below). Seventy-eight to 100% of the fleas died following total doses of 10 to 25 mg./kg.; whereas, a total dose of 200 mg./kg. produced no visible toxicity in the dog.

TABLE III

| Dosage in | Mg./Kg, Daily Dosage | No. Daily Doses | Dog Fleas Dead/Total | Percent Dead | Toxicity To Dogs |
|---|---|---|---|---|---|
| Feed | 100 | 2 | ---- | ---- | None. |
| Do | 25 | 1 | 20/20 | 100 | Do. |
| Do | 10 | 1 | 70/90 | 78 | Do. |
| Do | 5 | 3 | 39/40 | 98 | Do. |
| Capsule | 5 | 3 | 35/40 | 88 | Do. |
| Do | 5 | [1]2 | 35/40 | 88 | Do. |
| | None | ---- | 20/154 | 13 | |

[1] Over 3 days.

EXAMPLE 10

A dog with very severe skin lesions of demodectic mange is given repeated oral doses and topical dermal applications of phosphorothioic, acid, O,O-dimethyl-O-(3-methyl-4-sulfamoyl)phenyl ester over a period of seven days. The dog receives orally 100 mg. of compound/kg. of body weight on each of the first two days of treatment, and 50 mg./kg. on the seventh day. On each of days 3 through 7, 1% of the compound in corn oil is also applied to the skin lesions. No signs of toxicity are seen. Two days after the start of treatment the skin lesions are healing and a few dead mange mites are found. By the end of the treatment period, only a very few live mites are found in skin scrapings among very large numbers of dead mites. By a conservative estimate, more than 95% of the mites have been killed and skin lesions are markedly improved.

EXAMPLE 11

Five calves from a ranch infected with cattle grubs each receive, before grubs have appeared in the hide, 7.5 grams of phosphorothioic acid, O,O-dimethyl-O-(3-methyl-4-sulfamoyl)phenyl ester which is poured on the animals' backs dermally in a volume of four fluid ounces containing 25% cyclohexanone, 50% xylene, and about 12% of corn oil. No toxicity is seen and the animal's weight gains during the subsequent six week period are normal. Six weeks after treatment, the calves are examined for grubs and it is found that the average number of grubs in the five treated animals is 0.2 (1 grub in 5 calves); whereas at this time, the average grub number in 10 untreated calves is 7.9 (79 grubs total).

EXAMPLE 12

Preparation of 4-acetamido-2-chlorobenzenesulfonamide

In a 500 ml. four neck flask equipped with stirrer, condenser with drying tube and a thermometer there is placed 116.5 g. (1.0 mole; 65 ml.) of chlorosulfonic acid. At 20°–21° C., 33.9 g. (0.2 mole) of m-chloroacetanilide is added with good stirring. When the addition is completed, the reaction is warmed to 70° C. and maintained at this temperature for 7 hours, after which time the reaction mixture is poured over ice and the sticky mass washed by decantation. Now toluene and 200 ml. of ammonium hydroxide is added and the mixture stirred for 2–3 hours. The white powdery solid is filtered off, washed with water and dried to yield 22.5 g. (0.09 mole) of 4-acetamido-2-chlorobenzenesulfonamide, melting at 194°–197° C.

4-acetamido-2-bromobenzenesulfonamide may be prepared by this reaction by substituting m-bromoacetanilide for m-chloroacetanilide in the procedure detailed above.

EXAMPLE 13

Preparation of 4-amino-2-chlorobenzenesulfonamide

A mixture of 201.5 g. (0.81 mole) of 2-chloro-4-acetamidobenzenesulfonamide, 79.5 g. (1.95 moles) of 98% sodium hydroxide and one liter of water are refluxed 4 hours. After cooling the reaction mixture, the pH is adjusted to 6 and the solid collected by filtration, washed with water and dried. This gives 141.1 g. (0.69 mole), 84.5%, of 4-amino-2-chlorobenzenesulfonamide a melting point of 176.5–177.5° C.

When 2-bromo-4-acetamidobenzenesulfonamide is substituted for 2-chloro-4-acetamidobenzenesulfonamide the product of the reaction is 4-amino-2-bromobenzenesulfonamide.

EXAMPLE 14

Preparation of 2-chloro-4-hydroxybenzenesulfonamide

In a one liter three neck flask equipped with a stirrer, thermometer and a dropping funnel, there is placed 51.7 g. (0.25 mole) of 2-chloro-4-aminobenzenesulfonamide, 400 ml. of water and 150 ml. of sulfuric acid. Now at 22–24° C., a solution of 17.8 g. (0.25 mole) of 98% sodium nitrite in 50 ml. of water is added to the well stirred reaction mixture over a period of a few minutes. When the reaction mixture gives a negative starch-iodide test, it is diluted with 1.5 liters of water and filtered. The filtrate is added dropwise to 2 liters of boiling water with vigorous stirring. The red solution is decolorized with decolorizing charcoal and concentrated under reduced pressure to 500 ml. The solid that separated on cooling is filtered off and dried to yield 22.9 g. of product melting at 221.5°–226° C. Recrystallization of the crude product from acetic acid gives 15.9 g. of pure 2-chloro-2-hydroxybenzenesulfonamide melting at 225–226° C. From the mother liquors an additional 7.2 g. is obtained.

Employing 2-bromo-4-aminobenzenesulfonamide in the above reaction in place of the 2-chloro-4-aminobenzenesulfonamide yields 2-bromo - 4 - hydroxybenzenesulfonamide.

EXAMPLE 15

Preparation of phosphorothioic acid, O-3-chloro-4-sulfamoylphenyl O,O-dimethyl ester A mixture consisting of 15.9 g. (0.77 mole) of 2-chloro-4-hydroxybenzenesulfonamide, 200 ml. of water, 32 g. (0.231 mole) of potassium carbonate, 24.8 g. (0.154 mole) of dimethyl chlorothiophosphate, and 100 ml. of acetone is stirred for 32 hours at room temperature. After extracting the reaction three times with ether, the organic phases are combined, dried over sodium sulfate and the ether evaporated. The residue is crystallized from 30 ml. of toluene to give 16.4 g. of yellow solid, which is recrystallized once from benzene and then from a chloroform-carbon tetrachloride mixture to give 14.6 g. of pure product melting at 100–102° C.

Employing 2-bromo-4-hydroxybenzenesulfonamide in the above reaction in place of the corresponding 2-chloro-derivative yields phosphorothioic acid, O-3-bromo-4-sulfamoylphenyl O,O-dimethyl ester.

EXAMPLE 16

Three dogs were fed a medicated ration containing 2.5 mg. of phosphorothioic acid, O-3-chloro-4-sulfamoylphenyl O,O-dimethyl ester per kilogram of body weight. After 24 hours, an average of 95% of the fleas which were confined in capsules attached to the dogs' ears were dead.

EXAMPLE 17

To determine the efficacy of the O,O-dimethyl ester of O-3-chloro - 4 - sulfamoylphenyl phosphorothioic acid against natural infections of ascarids (*Toxocara canis*) in dogs, the compound was administered subcutaneously and orally to dogs at various dosages. Thereafter, the dogs were fed a standard kennel diet and the feces was examined for ascarids until the test was terminated 5 days after treatment. On termination the test dogs were necropsied and examined for remaining ascarids. The data obtained appear in Table IV below.

TABLE IV

| Dose mg./kg. | Route | Number of Dogs Treated | Total Number of Adult Ascarids | | Average Percent Adult Efficacy (Range) |
|---|---|---|---|---|---|
| | | | Passed | Retained | |
| 75 | S.c. | 1 | 8 | 0 | 100 |
| 50 | S.c. | 3 | 28 | 1 3 | 90 (75–100) |
| 50 | Oral | 2 | 10 | 0 | 100 |

1 6 immature.

EXAMPLE 18

The activity of the compounds of the invention against the sheep nematode *Trichostrongylus colubriformis* is demonstrated by the following tests wherein the experimentally infected animals are given 2000 larvae of *Trichostrongylus colubriformis*. Three weeks after infection, the test compound is administered to the infected animals by gavage. Five days later the animals are necropsied and examined. Activity of the test compound is determined by comparison of the treated animals with untreated controls. The results of the tests appear in Table V below.

TABLE V

[Percent removal of *Trichostrongylus colubriformis*]

| Compound | Dose, mg. (ml.)/kg. | No. of Animals | Percent Worm Removal |
|---|---|---|---|
| O,O-dimethyl-O-(3-methyl-4-sulfamoyl)phenyl ester | 500 | 2 | 94 |
| O,O-dimethyl-O-(3-methyl-4-N-methylsulfamoyl) phenyl ester | 250 | 2 | 98 |
| O,O-dimethyl-O-(3-methyl-4N-methylsulfamoyl) phenyl ester | 500 | 2 | 100 |

EXAMPLE 19

Following the procedure of Example 18, but substituting *Haemonchus contortus* for *Trichostrongylus colubriformis*, 100 mg./kg. of O,O-dimethyl-O-(3-methyl-4-N-methylsulfamoyl)phenyl ester of phosphorothioic acid was found to be 100% effective against *Haemonchus contortus* in sheep.

We claim:

1. Meta substituted sulfamoylphenyl esters of organic phosphates of the formula:

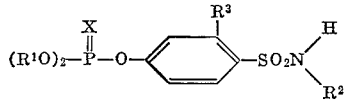

wherein $R^1$ is a lower alkyl radical, X is selected from the group consisting of sulfur and oxygen atoms, $R^2$ is hydrogen and $R^3$ is lower alkyl.

2. The compound phosphorothioic acid, O,O-dimethyl-O-(3-methyl-4-sulfamoyl)phenyl ester.

References Cited

Sumitomo: "Chemical Abstracts," vol. 57 (1962), p. 15560.

CHARLES B. PARKER, *Primary Examiner.*

ANTON H. SUTTO, *Assistant Examiner.*

U.S. Cl. X.R.

260—556, 945, 973; 424—211